(12) United States Patent
Flinn et al.

(10) Patent No.: US 6,795,826 B2
(45) Date of Patent: Sep. 21, 2004

(54) FUZZY CONTENT NETWORK MANAGEMENT AND ACCESS

(75) Inventors: Steven D. Flinn, Sugar Land, TX (US); Naomi F. Moneypenny, Houston, TX (US)

(73) Assignee: Manyworlds Consulting, Inc., Houston, TX (US)

( * ) Notice: Subject to any disclaimer, the term of this patent is extended or adjusted under 35 U.S.C. 154(b) by 349 days.

(21) Appl. No.: 09/805,082

(22) Filed: Mar. 13, 2001

(65) Prior Publication Data

US 2001/0047358 A1 Nov. 29, 2001

Related U.S. Application Data

(60) Provisional application No. 60/206,898, filed on May 25, 2000.

(51) Int. Cl.[7] .............................................. G06F 17/30
(52) U.S. Cl. ............................. 707/100; 707/1; 707/3; 707/4; 707/104.1
(58) Field of Search ................................ 707/100–103, 707/1, 3, 4, 104.1

(56) References Cited

U.S. PATENT DOCUMENTS

| | | | |
|---|---|---|---|
| 5,099,426 A | 3/1992 | Carlgren et al. ............. 364/419 |
| 5,206,951 A | * 4/1993 | Khoyi et al. .................. 719/315 |
| 5,600,835 A | 2/1997 | Garland et al. .............. 395/605 |
| 5,706,497 A | 1/1998 | Takahashi et al. ........... 395/605 |
| 5,809,506 A | 9/1998 | Copeland ..................... 707/103 |
| 5,812,691 A | 9/1998 | Udupa et al. ................ 382/128 |
| 5,815,710 A | * 9/1998 | Martin et al. ................ 719/316 |
| 5,875,446 A | * 2/1999 | Brown et al. ................... 707/3 |
| 5,893,085 A | 4/1999 | Phillips et al. ................. 706/52 |
| 5,899,992 A | 5/1999 | Iyer et al. ....................... 707/7 |
| 5,903,478 A | * 5/1999 | Fintel et al. .................... 703/6 |
| 5,907,846 A | * 5/1999 | Berner et al. ............ 707/103 R |
| 5,963,965 A | 10/1999 | Vogel .......................... 707/501 |
| 5,974,415 A | 10/1999 | Schreiber ........................ 707/6 |
| 6,016,394 A | 1/2000 | Walker ........................ 395/701 |
| 6,049,799 A | 4/2000 | Mangat et al. ................ 707/10 |
| 6,134,559 A | * 10/2000 | Brumme et al. ......... 707/103 R |
| 6,285,999 B1 | * 9/2001 | Page .............................. 707/5 |
| 6,468,210 B1 | * 10/2002 | Iliff .............................. 600/300 |

* cited by examiner

*Primary Examiner*—Safet Metjahic
*Assistant Examiner*—Hanh Thai
(74) *Attorney, Agent, or Firm*—Carrie A. Boone, P.C.

(57) ABSTRACT

A system and a method for managing information encapsulates the information as objects. The objects are related by a degree to other objects in a content network. The relationships between the objects may be established and enhanced by various human or automatic means. An attractive user interface facilitates use and management of the network by many users. Access to the content network may be customized for distinct user groups.

33 Claims, 16 Drawing Sheets

|    | t1 | t2 | t3 | t4 | t5 | t6 | t7 | t8 | ... | tn | c1 | c2 | c3 | c4 | c5 | c6 | c7 | c8 | ... | cm |
|----|----|----|----|----|----|----|----|----|----|----|----|----|----|----|----|----|----|----|----|----|
| t1 | 1 | 0.4 | 0 | 0 | .5 | 0 | .3 | ... | 0 | 0.3 | 0 | .8 | 0 | 0.4 | 0 | ... | .4 |
| t2 | 0 | 1 | 0 | .3 | 0 | .2 | 0 | 0 | ... | 0 | .9 | 0 | 0 | 0.2 | .4 | .3 | 0 | ... | .3 |
| t3 | .3 | .4 | 1 | 0 | 0 | 0 | .6 | .1 | ... | 0 | 0 | 0 | 0 | .2 | .7 | .6 | 0 | .4 | ... | 0 |
| t4 | .1 | .4 | .3 | 1 | .3 | 0 | 0 | 0 | ... | .1 | .1 | 0 | 0 | 0.4 | 0 | .3 | 0 | ... | .2 |
| t5 | 0 | 0 | .7 | 0 | 1 | .2 | 0 | .3 | ... | 0 | .6 | 0 | 0 | .3 | 0 | 0.1 | .9 | ... | 0 |
| t6 | .1 | 0 | 0 | 0 | .8 | 1 | .6 | 0 | ... | .1 | 0 | 0 | 0 | 0.4 | 0.2 | .3 | ... | 0 |
| t7 | .2 | .1 | .8 | 0 | 0 | .3 | 1 | 0 | ... | 0 | .5 | 0.2 | 0 | .8 | 0 | 0 | .1 | ... | .2 |
| t8 | 0 | 0 | 0 | .5 | .5 | 0 | 0 | 1 | ... | .9 | 0 | 0 | 0 | .8 | .2 | 0 | 0 | .8 | ... | 0 |
| ... | | | | | | | | | | | | | | | | | | | | |
| tn | 0 | 0 | 0 | .4 | .3 | 0 | .3 | 0 | ... | 1 | 0.3 | 0 | 0 | .4 | 0 | .2 | .6 | ... | .2 |
| c1 | .3 | .8 | 0 | 0 | .8 | 0 | .2 | 0 | ... | 0 | 1 | .3 | 0 | 0.6 | 0.4 | 0 | ... | .4 |
| c2 | 0 | 0 | 0 | 0 | .4 | .3 | 0 | 0 | ... | .8 | 0 | 1 | .3 | 0 | 0 | .3 | .9 | 0 | ... | 0 |
| c3 | .2 | .1 | .2 | 0 | .7 | 0 | 0 | 0 | ... | 0 | 0 | .3 | 1 | 0 | 0 | 0.9 | 0 | ... | 0 |
| c4 | .1 | .3 | 0 | 0 | .2 | .7 | .8 | .2 | ... | 0 | 0 | 0 | .3 | 1 | 0 | 0 | 0 | .8 | ... | .9 |
| c5 | .1 | .2 | 0 | 0 | .6 | 0 | .5 | 0 | ... | .4 | 0 | 0 | .7 | 0 | 1 | .2 | 0 | 0 | ... | .6 |
| c6 | .3 | 0 | .2 | 0 | 0 | .5 | .5 | 0 | ... | .1 | 0 | .2 | 0 | 0.3 | 1 | 0 | .2 | ... | 0 |
| c7 | 0 | 0 | 0 | 0 | .7 | .7 | 0 | .4 | ... | .2 | 0 | 0 | .3 | 0 | .7 | 0 | 1 | .1 | ... | 0 |
| c8 | .1 | .2 | 0 | 0 | .6 | .6 | 0 | 0 | ... | .3 | 0 | 0 | 0.2 | .3 | 0 | .8 | 0 | 1 | ... | 0 |
| ... | | | | | | | | | | | | | | | | | | | | |
| cm | 0 | .1 | .1 | 0 | .4 | 0 | 0 | .3 | ... | 0 | 0 | .7 | 0 | .6 | 0 | .3 | .3 | .1 | ... | 1 |

FUZZY CONTENT NETWORK MANAGEMENT AND ACCESS

CROSS-REFERENCE TO RELATED APPLICATIONS

The present application claims priority under 35 U.S.C. § 119(e) to U.S. Provisional Patent Application Serial No. 60/206,898, entitled "A Method and System of Generative Content Preparation and Retrieval," filed May 25, 2000.

BACKGROUND

This invention relates to storage and management of information and, more particularly, to a fuzzy set-based architecture and data model for information management.

Information is ubiquitous. A dramatic increase in the use of distributed networks, such as the Internet, has made information available in an unparalleled manner for both sophisticated and unsophisticated users. The ability to cheaply store data as well as the increase in processing capability allows data to be exchanged and replicated in ways that were previously unimaginable.

Further, the information is available in various forms. Where once text-based data was the norm, information data items now may be available as images, computer-aided design (CAD) presentations, video clips, and applets, to name a few examples. Such data is intermixed with spreadsheets, hyper-text markup language (HTML) files, and word processing files.

However, accessing the relevant information can be a frustrating experience. A business, for example, may have information scattered all over the enterprise. The information may include Word™ documents, Excel™ spreadsheets, video files, PowerPoint™ presentations, and so on. Often, a hierarchical structure is established for storing the information, but the relationship between the data items is not effectively catalogued. Further, incompatibility between file formats often frustrates information access.

On the Internet, information access is often sought using a search engine. Examples of search engines currently available on the Internet include "Yahoo!," "Google," and "Alta Vista." The search engines may use keywords or other indicia with which to search for relevant items. Unfortunately, such searches are prone to being simultaneously under-selective and over-selective, forcing the user to sift through many unrelated documents, before retrieving the desired items.

Whether on a local network or a wide-area network such as the Internet, information is most commonly maintained in a flat file structure. The files are often "related" in a tree hierarchy, but the relationships provide very limited information on context of the files. The most sophisticated search engines are powerless to provide truly meaningful results when confronting such poor organization of information.

The completeness and relevancy of the information sought may be as valuable as the speed of accessing and retrieving the information. Unless the information presented is focused, relevant, useful, and intelligently organized, the value of the search engine, as well as the overall system, is diminished.

Thus, there is a continuing need for an intelligent, adaptive method of organizing and retrieving information.

SUMMARY OF THE INVENTION

In accordance with the embodiments described herein, a method comprises encapsulating information in an object, wherein the object is in a network of objects, establishing a degree of relationship to another object, relating the object to the other object in the network, and accessing any object in the network.

Other features and embodiments will become apparent from the following description, from the drawings, and from the claims.

BRIEF DESCRIPTION OF THE DRAWINGS

FIG. 15 is a diagram of a content affinity matrix according to one embodiment of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with the embodiments described herein, a system and a method for managing data is disclosed. The content is organized in a content network including objects. The objects encapsulate the data.

In one embodiment, the objects in the content network are related by a degree, rather than wholly being related, or not at all. The relationships between the objects may be established and enhanced by human and/or by automatic means.

In one embodiment, an attractive user interface facilitates use and management of the content network simultaneously by many users. Access to the content network further may be customized for distinct user groups.

Fuzzy Set Theory

The relational database paradigm, as first described by Codd in 1970, employs a generalized, abstract mathematical model (based on classical set theory) to create a platform for computer-based management of information. This model has been employed in the majority of database applications over the past decade or so, for storing, organizing, and managing database information. While powerful, the classical database paradigm includes some fundamental limitations that may impair its effectiveness in some environments.

One competing mathematical model is known as fuzzy set theory. In fuzzy set theory, as opposed to classical (Aristotelian) set theory, objects do not necessarily completely belong or not belong to a particular set. Instead, objects may belong to a set to some degree. At the extremes of "belonging," with a certitude of yes or no, fuzzy sets are equivalent to classic sets. Classic set theory is thus a subset of fuzzy set theory—classic sets simply represent a special case of fuzzy sets.

Multi-valued, also known as fuzzy, logic is typically associated with fuzzy sets. Unlike traditional sets, fuzzy sets may accurately represent the "shades of gray" of the world. Whereas traditional set theory forces an item to definitely be included in a set or not, fuzzy set theory allows the item to be partially included in the set.

The human brain is a symbolic processor that actually operates as a processor of fuzzy sets. This is not surprising, given that the human brain has evolved to operate very effectively in a world that is essentially fuzzy. Computer programs, on the other hand, typically operate using a binary logic, in accordance with classical set theory.

Content Network

Figure 1:
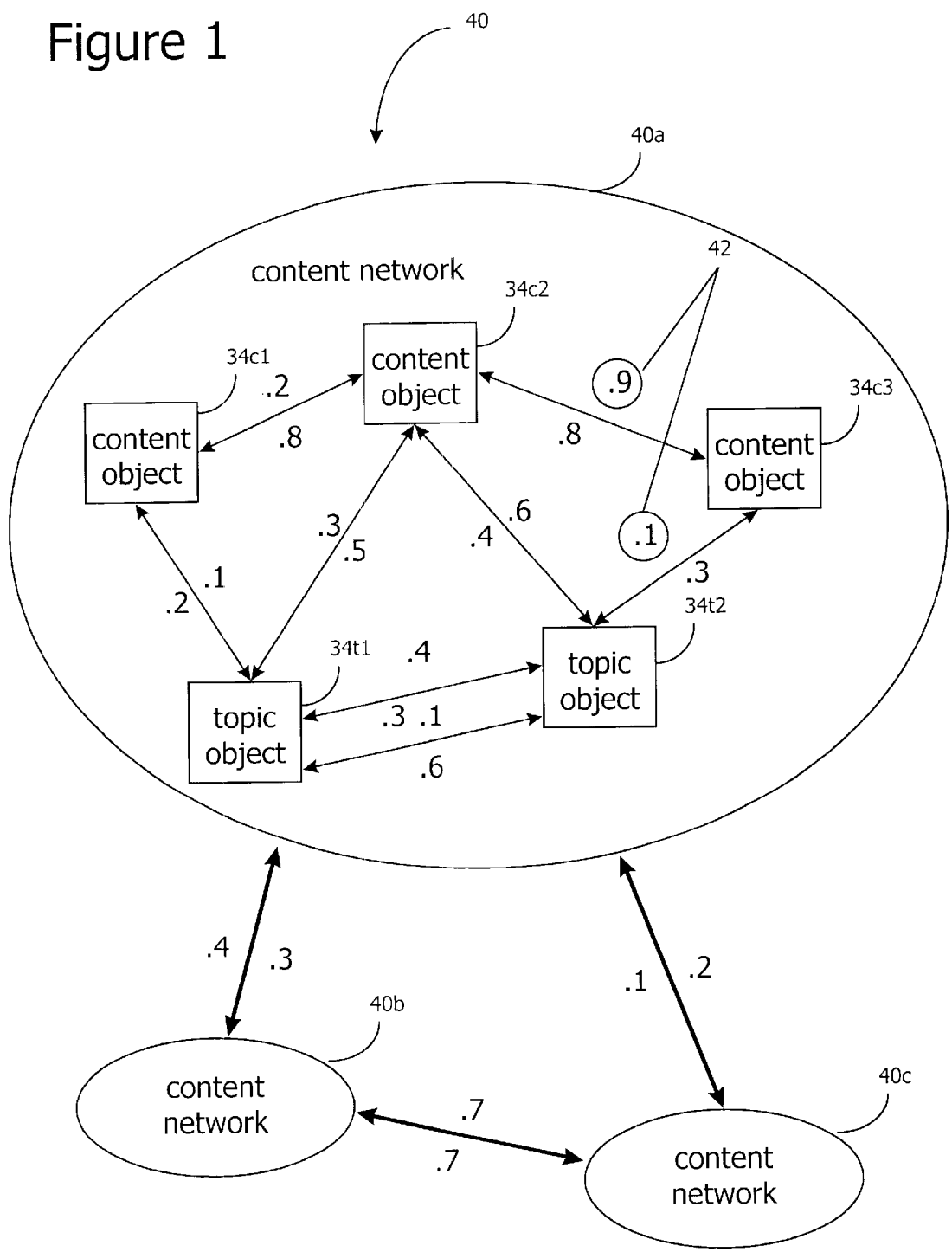
FIG. 1 is a block diagram of a content network according to one embodiment of the invention.

According to one embodiment, FIG. 1 illustrates a content network 40, including content sub-networks 40a, 40b, and 40c. The content network 40 includes "content," "data," or "information," packaged in modules known as objects 34.

In one embodiment, the content network 40 employs features commonly associated with "object-oriented" software to manage the objects 34. That is, the content network 40 discretizes information as "objects." In contrast to typical procedural computer programming structures, objects are defined at a higher level of abstraction. This level of abstraction allows for powerful, yet simple, software architectures.

Figure 2:
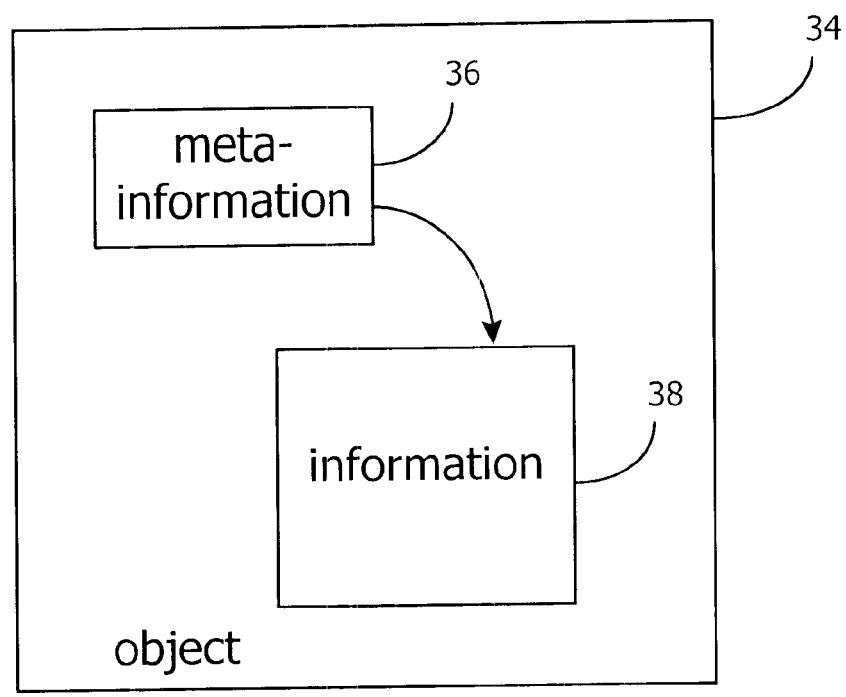
FIG. 2 is a block diagram illustrating encapsulation of objects according to one embodiment of the invention.

One benefit to organizing information as objects is known as encapsulation. An object is encapsulated when only essential elements of interaction with other objects are revealed. Details about how the object works internally are hidden. In FIG. 2, for example, an object 34 includes meta-information 36 and information 38. The object 34 thus encapsulates information 38.

Another benefit to organizing information as objects is known as inheritance. The encapsulations of FIG. 2, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 3A:
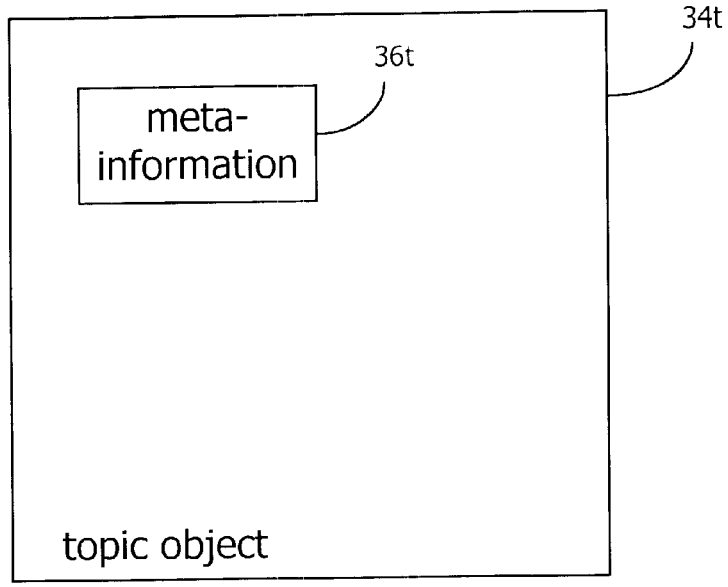
FIGS. 3A and 3B are block diagrams of topic and content objects according to one embodiment of the invention.
Figure 3B:
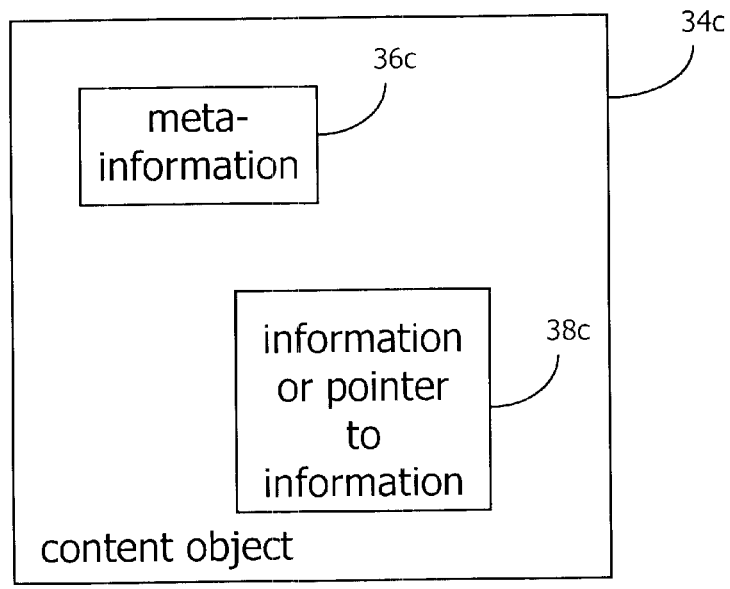

In one embodiment, the objects 34 comprise either topic objects 34t or content objects 34c, as depicted in FIGS. 3A and 3B, respectively. Topic objects 34t are encapsulations that contain meta-information 36t and relationships to other objects (not shown), but do not contain an embedded pointer to reference associated information. A topic object 34 essentially operates as a "label" to a class of information. A topic object 34 therefore just refers to "itself" and the network of relationships it has with other objects 34.

Content objects 34c are encapsulations that contain meta-information 36c and relationships to other objects 34 (not shown). Additionally, content objects 34c may include either an embedded pointer to information or the information 38c itself (hereinafter, "information 38").

The referenced information 38c may include files, text, documents, articles, images, audio, video, multi-media, software applications and electronic or magnetic media or signals. Where the content object 34c supplies a pointer to information, the pointer may be a memory address. Where the content network 40 encapsulates information on the Internet, the pointer may be a Uniform Resource Locator (URL).

In one embodiment, the meta-information 36 supplies a summary or abstract of the object 34. So, for example, the meta-information 36t for the topic object 34t may include a high-level description of the topic being managed. Examples of meta-information 36t include a title, a sub-title, one or more descriptions of the topic provided at different levels of detail, the publisher of the topic meta-information, the date the topic object 34t was created, and subjective attributes such as the quality of the referenced information. Meta-information may also include a pointer, such as a uniform resource locator (URL), in one embodiment.

The meta-information 36c for the content object 34c may include relevant keywords associated with the information 38, a summary of the information 38, and so on. In one embodiment, the meta-information 36 supplies a "first look" at the objects 34. The meta-information 36c may include a title, a sub-title, a description of the information 38, the author of the information 38, the publisher of the information 38, the publisher of the meta-information 38, and the date the content object 34c was created, as examples. As with the topic object 34t, meta-information for the content object 34c may also include a pointer, in one embodiment.

In FIG. 1, the content sub-network 40a is expanded, such that both content objects 34c and topic objects 34t are visible. Bi-directional relationships between topic objects, content objects, and sub-networks are indicated by double-pointing arrows between the entities. In one embodiment, the various objects 34 of the content network 40 are interrelated by degrees, using relationship indicators 42, as illustrated in FIG. 1. Each object 34 may be related to any other object 34, and may be related by a relationship and associated relationship indicator 42, as shown. Thus, while information 38 is encapsulated in the objects 34, the information 38 is also interrelated to other information 38 by a degree manifested by the relationship indicators 42.

In one embodiment, the relationship indicator 42 is a numerical indicator of the relationship between objects 34. Thus, for example, the relationship indicator 42 may be normalized to between 0 and 1, inclusive, where 0 indicates no relationship, and 1 indicates a subset relationship. In another embodiment, the relationship indicators 42 are expressed using subjective descriptors that depict the "quality" of the relationship. For example, subjective descriptors "high," "medium," and "low" may indicate a relationship between two objects 34.

Additionally, the relationships between objects may be bi-directional, as indicated by the double-pointing arrows.

Each double-pointing arrow includes two relationship indicators 42, one for each "direction" of the relationships between objects 34.

As FIG. 1 indicates, the relationships between any two objects 34 need not be symmetrical. That is, topic object 34t1 has a relationship of "0.3" with content object 34c2, while content object 34c2 has a relationship of "0.5" with topic object 34t1.

In some embodiments, content networks 40 may themselves be related using relationship indicators 42. For example, in FIG. 1, content sub-network 40a is related to content sub-network 40b and content sub-network 40c, using relationship indicators 42. Likewise, content sub-network 40b is related to content sub-network 40a and content sub-network 40c using relationship indicators 42.

In another embodiment, individual content and topic objects 34 within a selected content sub-network 40a may be related to individual content and topic objects 34 in another content sub-network 40b. In yet another embodiment, multiple sets of relationship indicators 42 may be defined between two objects 34.

For example, a first set of relationship indicators 42 may be used for a first purpose or be available to a first set of users while a second set of relationship indicators 42 may be used for a second purpose or available to a second set of users. For example, in FIG. 1, topic object 34t1 is bidirectionally related to topic object 34t2, not once, but twice, as indicated by the two double arrows. The content network 40 may thus be customized for various purposes and accessible to different user groups in distinct ways simultaneously.

The relationships among objects 34 in the content network 40 as well as the relationships between content networks 40 are modeled after fuzzy set theory, according to one embodiment. Each object 34, for example, may be considered a fuzzy set with respect to all other objects 34, which are also considered fuzzy sets. The relationships among objects 34 are the degrees to which each object 34 belongs to the fuzzy set represented by any other object 34. Although not essential, every object 34 in the content network 40 may conceivably have a relationship with every other object 34.

In one embodiment, the topic objects 34t encompass, and are labels for, very broad fuzzy sets of the content network 40. The topic objects 34t thus may be label for the fuzzy set, and the fuzzy set may include relationships to other topic objects 34t as well as related content objects 34c. Content objects 34c, in contrast, typically refer to a narrower domain of information in the content network 40.

Preparation and Retrieval of the Content Network

Figure 4:
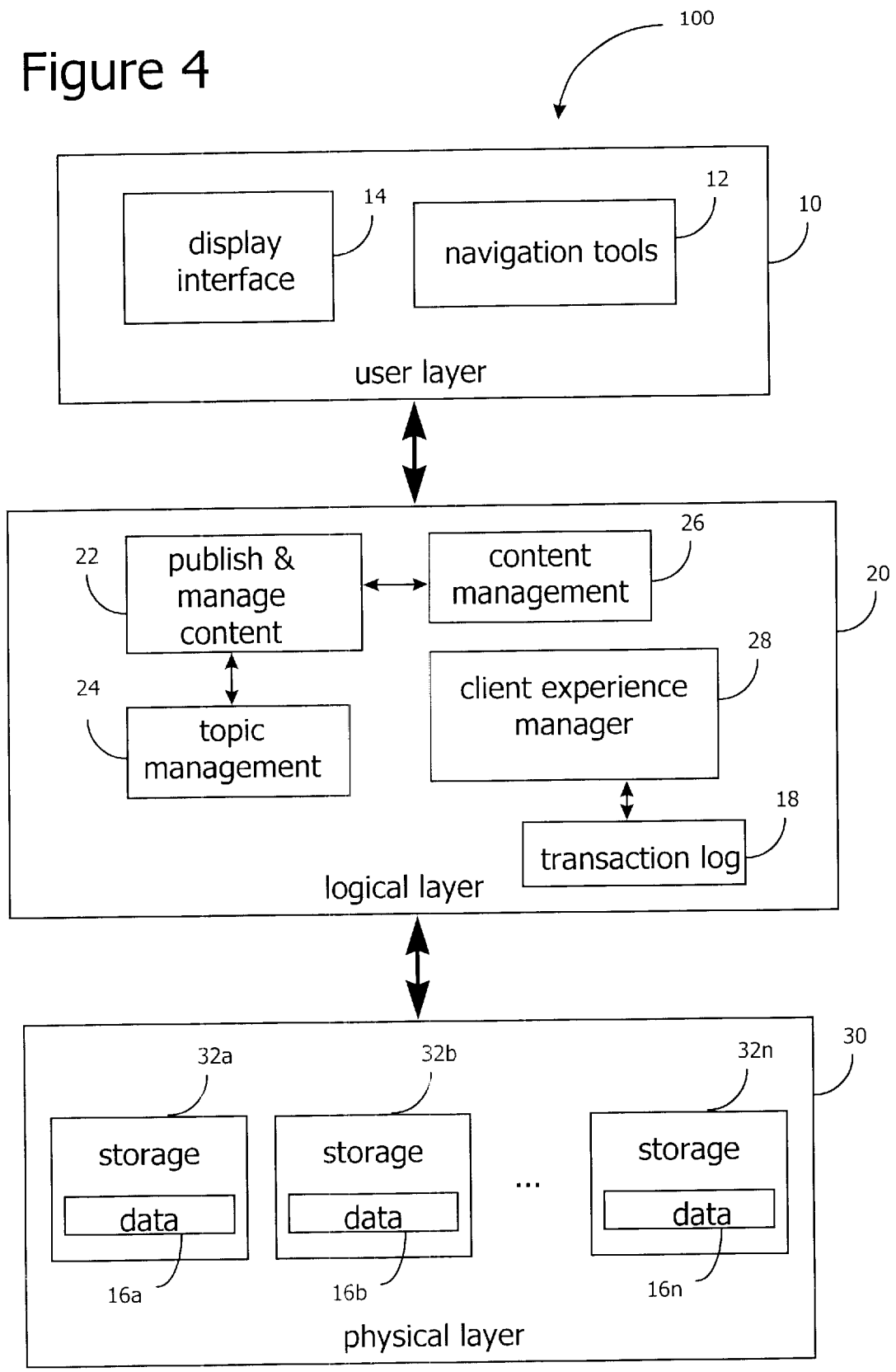
FIG. 4 is a block diagram of a system according to one embodiment of the invention.

In FIG. 4, a system 100 employs fuzzy set-based features to manage the content network 40, according to one embodiment. A user layer 10 enables access to the content network 40, a logical layer 20 includes tools for managing the content network 40, and a physical layer 30 stores elements of the content network 40.

Figure 5:
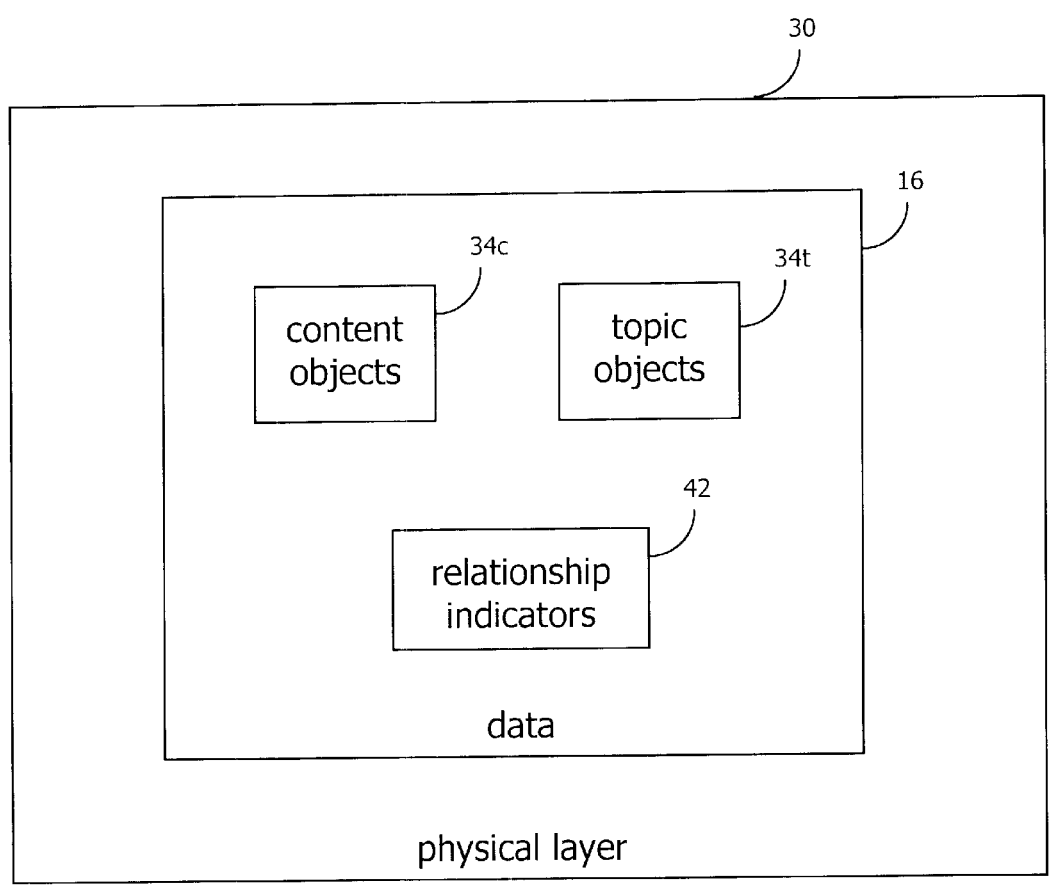
FIG. 5 is a block diagram of the data of FIG. 4 according to one embodiment of the invention.

Elements of the content network 40, as depicted in FIG. 1, include content objects 34c, topic objects 34t, and relationship indicators 42, as shown in FIG. 5. In one embodiment, the relationship indicators 42 are stored separately from the content and topic objects 34, as depicted. In another embodiment, the relationship indicators 42 are embedded within the objects 34.

The physical layer 30 includes one or more storage devices 32 for storing the content network 40. In FIG. 4, for example, n storage devices 32 are in the physical layer 30. The storage 32 may be on computer storage devices, such as disk drives or drive arrays, compact disk read-only memory (CDROM), digital audio tape (DAT), or other non-volatile storage media. The physical layer 30 may reside wholly on a single processor-based system, on a network of computers, or on a network of storage devices. For an Internet-based implementation, the storage 32 may reside on a variety of physical servers in multiple geographic areas.

The content network 40 in the physical layer 30 may be stored in file structures, but also may be stored and managed by database applications. The database applications may include relational database systems, object-oriented database systems, or other database types.

For example, where the content network 40 is stored in a relational database, the meta-information 36 for each object 34 may be stored in relational database tables. Likewise, the relationship indicators 42 may be stored in tables. Individual tables may be established for topic information, content information, topic-to-topic relationships, topic-to-content relationships and content-to-content relationships.

The information 38 (or a pointer to the information, as the case may be) may also reside in tables in the relational database. Alternatively, the information 38 may reside in files on the storage 32.

Also part of the system 100, the logical layer 20 represents the physical layer 10 at a level of abstraction that is understandable to humans. The entire content network 40 is represented at the logical layer 20, including the content and topic objects 34, the associated meta-information 36, and the (possibly multiple) relationship indicators 42 between the objects 34. Additionally, relationship indicators 42 between content networks 40 may be represented in the logical layer 20 as well in as the physical layer 30.

In one embodiment, the logical layer 20 and the physical layer 30 additionally keep track of usage patterns associated with users of the content network 40. Security information, such as may indicate which portions of the content network 40 are accessible by particular groups of users, may also be part of the logical layer 20.

In one embodiment, the logical layer 20 includes software modules for managing the content stored at the physical layer 30. For example, software module 22 is an application for publishing and managing the content of the physical layer 30. Coupled to software module 22, a topic management module 24 performs operations for managing topic objects 34t and a content management module 26 performs operations for managing content objects 34c, according to one embodiment.

Since the objects 34 of the system 100 are related according to the principles of fuzzy logic, the objects 34 may be operated upon using logical set operators on a fuzzy network. Logical set operators on a fuzzy network may include fuzzy union and fuzzy intersection operators, among others. In one embodiment, the module for publishing and managing the content 22 uses logical set operators.

In one embodiment, logical set operators enable users to perform logical operations directly on topic objects 34t and their associated part of the content network 40. For example, a static copy function (logical union operator) may be defined in which one or more topic objects 34t and associated content network 40 are copied into a second topic object 34t on a one-time basis.

In another embodiment, a relevancy control 54 may be invoked to increase or decrease the granularity of a static copy function being performed. For example, where only highly relevant objects 34 from a particular content network 40 are to be copied into another topic object 34t, fewer objects 34 may be selected for logical union than where medium to only slightly relevant objects 34 are copied. The relevancy control feature is discussed in more detail in conjunction with FIG. 11, below.

Alternatively, a dynamic copy function may be defined in which one or more topic objects 34t and associated content network 40 are copied into another topic object 34t on a continuous basis. For example, topic object C ("copied" object) may be continuously copied into topic object D ("destination" object). In this manner, the most current version of the topic object C is continuously available in the topic object D.

A fuzzy intersection operator may also be used for both static and dynamic copying of objects 34. In one embodiment, a logical intersection between topic objects 34t and their content network 40 may be performed. Common elements of the topic object 34t and its associated content network 40 is copied, either statically (e.g., once) or dynamically (e.g., continuously), to a destination topic object 34t.

Topic Management

Figure 6:
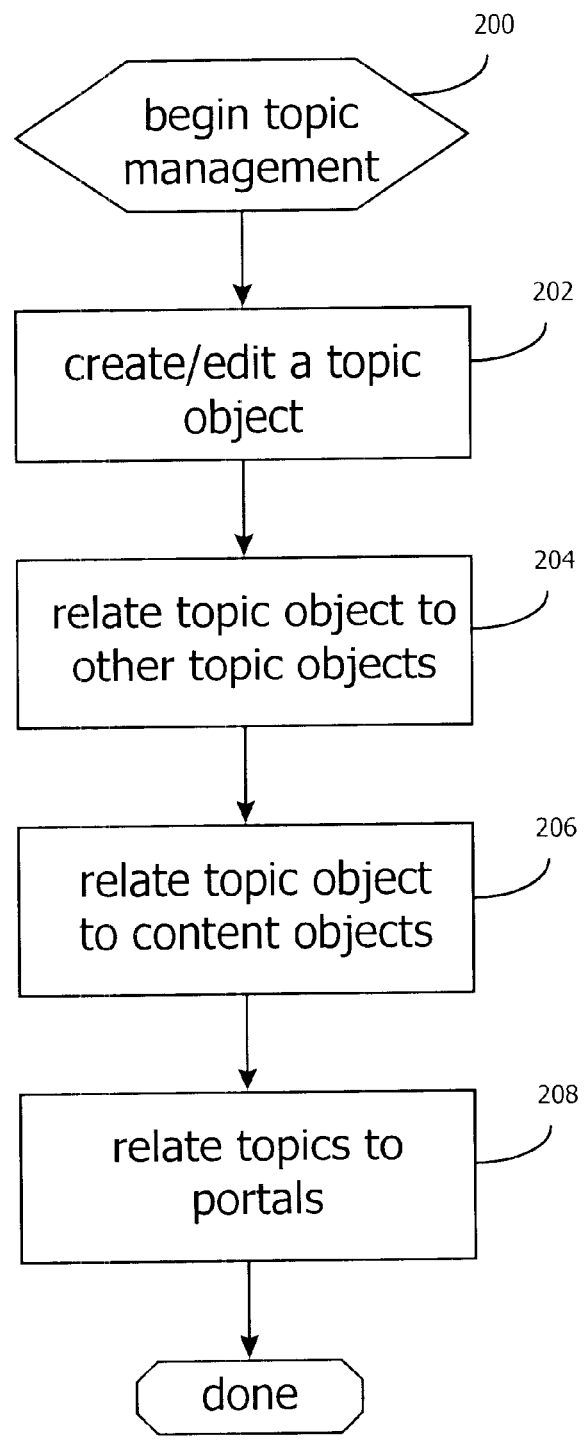
FIG. 6 is a flow diagram of operation of the topic management software according to one embodiment of the invention.

Operation of the topic management module 24, according to one embodiment, is depicted in the flow diagram of FIG. 6. The topic management module 24 is invoked either to create or to edit a topic object 34t (block 202). In one embodiment, topic objects 34t are created or edited by a user, such as a publisher or administrator of the content network 40. In a second embodiment, topic objects 34t are created or edited automatically by the topic management module 24 or an external system.

A user or the topic management module 24 may enter or edit the associated meta-information 36t, as desired. Once the topic object 34t is created/updated, the user or the topic management module 24 may relate the object 34t to other topic objects 34t in the content network 40, according to one embodiment (block 204).

In one embodiment, a list of the existing topic objects 34t and appropriate associated meta-information 36t is presented in a display interface 14 to facilitate selection of topic relationships. The display interface 14 is part of the user layer 10, described in more detail below. The strength of each relationship, or the relationship indicators 42, may additionally be assigned using the display interface 14. Assigning relationship indicators 42 may be established bidirectionally, as depicted in FIG. 1.

Additionally, the new or newly edited topic object 34t may be related to one or more content objects 34c (block 206). In one embodiment, a list of the existing content objects 34c and appropriate associated meta-information 36c is presented in the display interface 14, for both establishing a relationship and assigning relationship indicators 42 between the related objects 34. Again, such relationships may be bi-directionally established.

Finally, in one embodiment, the new or newly edited topic object 34t may be allocated to one or more portals 66 (block 208). The operations of the topic management module 24, according to one embodiment, is thus complete.

Content Management

Figure 7:
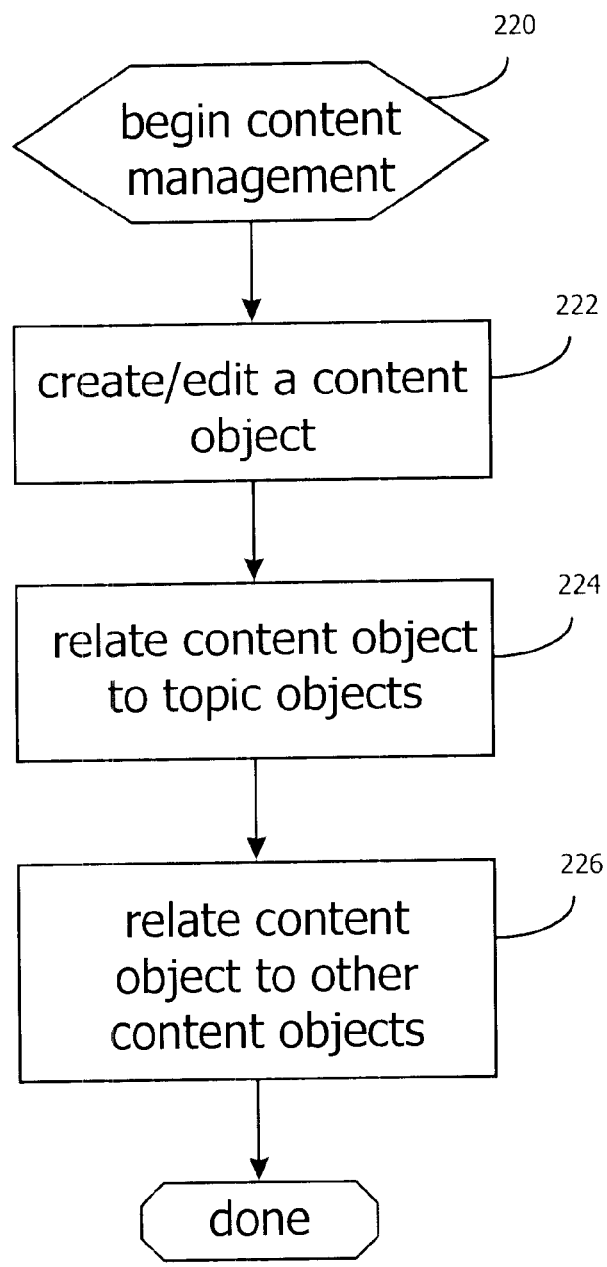
FIG. 7 is a flow diagram of operation of the content management software according to one embodiment of the invention.

Also coupled to the module 22 for publishing and managing content is a content management module 26. Operation of the content management module 26, according to one embodiment, is depicted in FIG. 7. As with the topic objects 34t, the content objects 34c may be generated or updated automatically by the content management module 26 or an external system, or by a user, such as an administrator or publisher of the content network 40.

The content management module 26 or user creates new content objects 34c or edits existing content objects 34c, as desired (block 222). Using the display interface 14, a user may enter or edit meta-information 36 for the content object 34c, for example.

If desired, the user or the content management module 26 may further relate the new or existing content object 34c to one or more topic objects 34t (block 224). In one embodiment, the display interface 14 provides a list of the existing topic objects 34t and associated meta-information 36t, allowing the user or the content management module 26 to select the topic objects 34t to be related. Additionally, relationship indicators 42 may be bi-directionally assigned, where content-to-topic relationships are established.

Relationships between the newly created or edited content object 34c may also be established with other content objects 34c (block 226), either automatically or by the user. Relationship indicators 42, as illustrated in FIG. 1, may be assigned bi-directionally for each content-to-content relationship.

Figure 8:
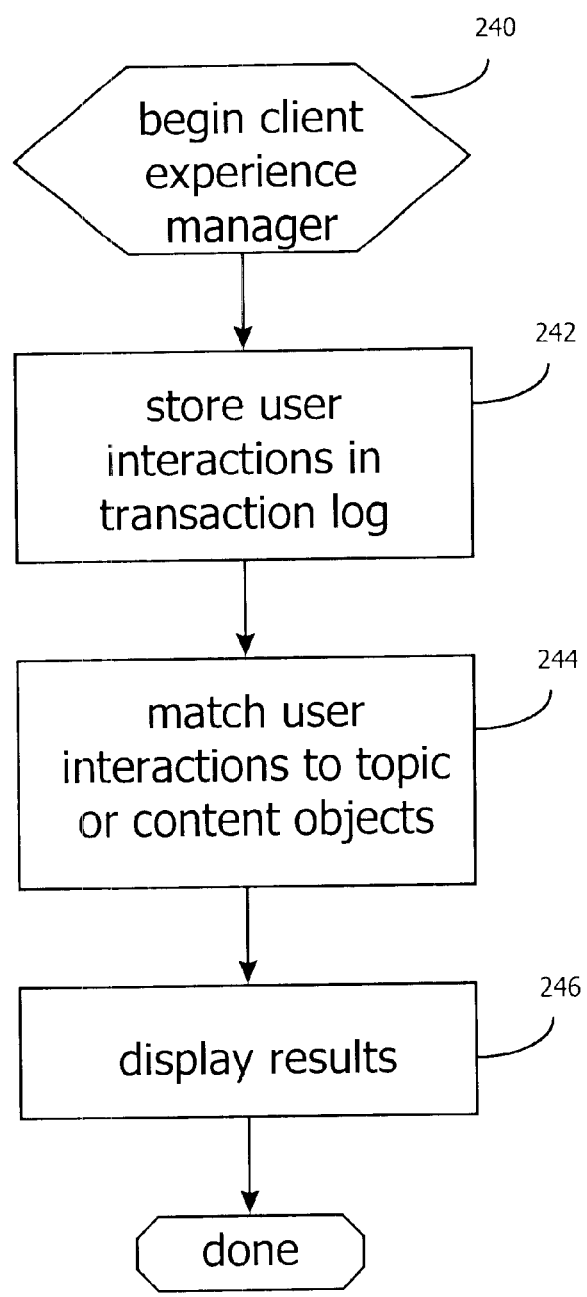
FIG. 8 is a flow diagram of operation of the client experience manager according to one embodiment of the invention.

Also part of the logical layer 20, a client experience manager 28 tracks usage of the physical layer 30, using a transaction log 18. Operation of the client experience manager 28, according to one embodiment, is depicted in the flow diagram of FIG. 8. User interaction with the content network 40 of the physical layer 30 is stored in the transaction log 18 (block 242).

Individual user access to content or topic objects 34, the number of users accessing an object 34, and other indications of usage may be tracked by the client experience manager 28 (block 244). This enables users and administrators to view the content network 40 usage at the level of the individual topic objects 34t and content objects 34c.

The usage patterns may also be processed so as to provide relationships among the objects in a content network 40 based on usage, either at the level of individual user, or groups of users.

Client Experience Management

In one embodiment, the information supplied by the client experience manager 28 is provided by the display interface 14 (block 246). The display interface 14 facilitates interactive selection and sorting of the content network 40. The client experience manager 28 thus allows publishers and administrators of the content network 40 to observe customer usage at a fine granularity. Accordingly, publishers and administrators may be able to adjust the content network 40 based on the detailed usage patterns.

In one embodiment, the system 100 facilitates searches of the content network 40 by providing a sophisticated, yet friendly, user interface. For example, portions of the content network 40 that meet specific search criteria may be displayed. Search operations based upon key word searching, statistical pattern matching, or other techniques are supported. The searching may be performed across the entire content network 40, or selected portions thereof, as specified by user.

The granularity of a search operation may be specified, in some embodiments. For example, at a first level of searching, the search may be conducted against just the meta-information 36 of topic or content objects 34 for a predetermined portion of the content network 40. A second level of searching may then be performed on the information 38 of the objects 34 selected in the first level of searching.

Display Interface

Much of the navigational and search capabilities of the system 100 are provided by the user layer 10, according to one embodiment. Referring back to FIG. 4, the user layer 10 provides the display interface 14 to facilitate access to the content network 40 by users of the system 100. In one embodiment, the display interface 14 is a graphical user interface (GUI) that, for many operations, provides a representation of the content network 40.

The display interface 14 is adaptable to a variety of user types. For example, in one embodiment, the system 100 is accessible to both read-only users and users who publish, edit, and relate the topic and content objects 34. These two types of users may access the system 100 simultaneously. Display features presented to each user are adjusted according to the type of user accessing the display interface 14.

In one embodiment, the display interface 14 accesses data structures (not shown) that store the topic and content objects 34 requested by the user. The portion of the content network 40 that is accessed may be organized by the display interface 14 to be visually effective.

Figure 9:
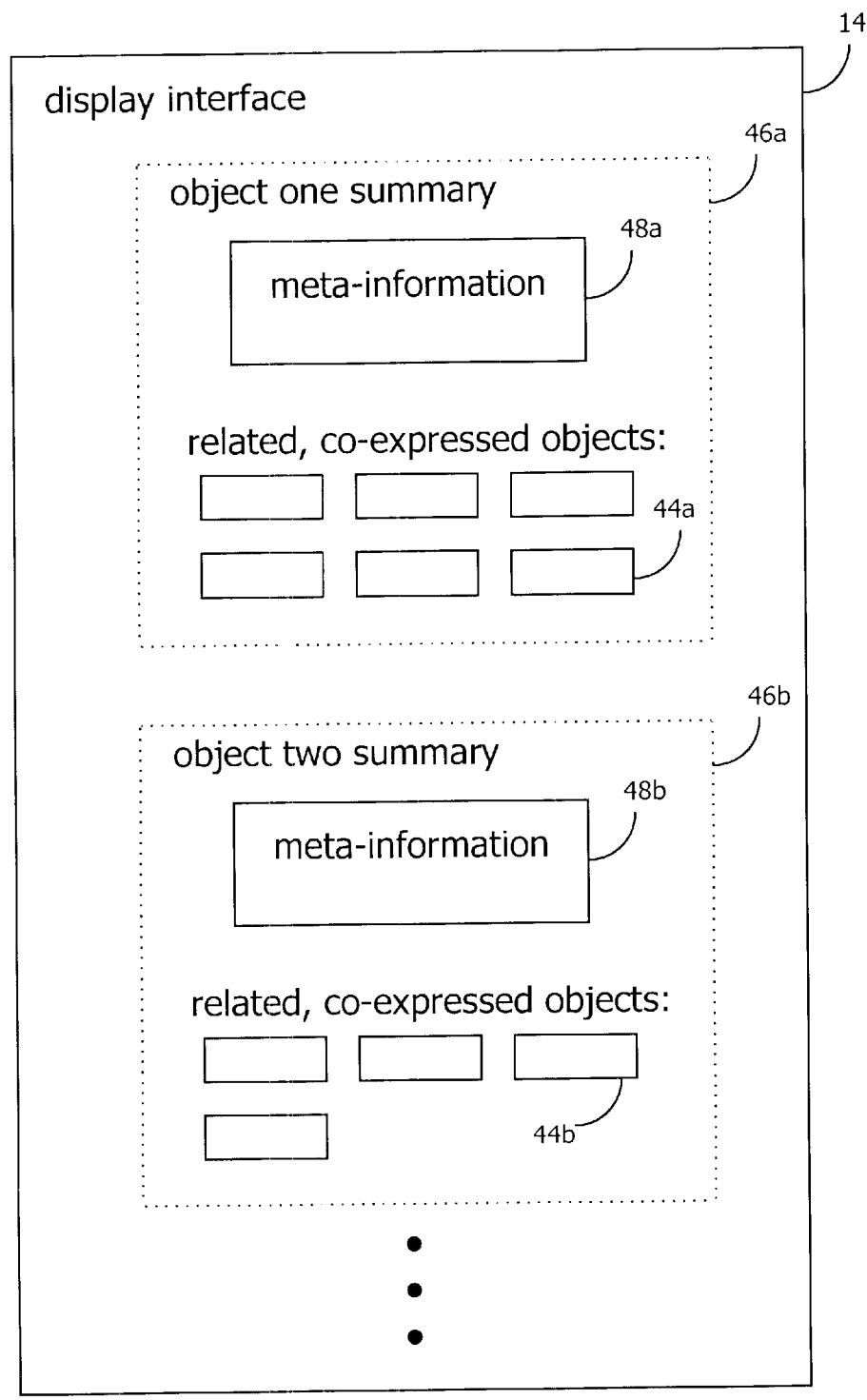
FIG. 9 is a block diagram of the display interface according to one embodiment of the invention.

For example, the display interface 14, according to one embodiment, is illustrated in FIG. 9. The display interface 14 may express one or more objects 34. An object 34 may be summarized on the display interface 14 as an object summary 46. The object summaries 46 describe either topic objects 34t or content objects 34c.

For example, a first object summary 46a is presented to the display interface 14 to represent a selected object 34. The first object summary 46a includes meta-information 48a, a display window that includes the meta-information 36 for the object 34 being presented. The first object summary 46a further provides a list of related objects 44a. The list of related objects 44a include one or more objects 34 that are deemed related to the selected object 34.

The related objects 44a are coupled together, or co-expressed, with the meta-information 48a in the first object summary 46a. This facilitates access to the object 34 represented by the first object summary 46a, by supplying both a preview of the object 34 (the meta-information 48a) and a connection to related objects 44a. The arrangement of the display interface 14 thus assists in navigating among closely related topic and content objects 34, according to one embodiment.

A second object summary 46b is also presented on the display interface 14. The second object summary 46b represents an object 34 in the physical layer 30. The second object summary 46b includes meta-information 48b, as well as related objects 44b. The presentation of additional object summaries 46 may be available, such as by scrolling down the display interface 14.

The meta-information 48 provides a context for each object summary 46 presented. A user may thus readily determine whether object one summary 46a is in accord with the search query. If so, the user may decide to select one of the related, co-expressed objects 44a. In one embodiment, a mouse click on one of the co-expressed objects 44 causes an object summary 46 for the selected co-expressed object 44 to be displayed.

The display interface 14 may be implemented as a web-based interface, such as for use on the Internet. In one embodiment, all or part of the content network 40 may be presented on the display interface 14. Each object summary 46 may be scrolled through, with related objects 44 co-expressed. The volume of display results may be limited by the user.

During presentation of a query result or of a portion of the content network 40, a representation of a content object 34c may be presented on the display interface 14. The presentation does not typically include the actual information 38 (or pointer to the information, as the case may be). Instead, in the object summary 46, the meta-information 36c provides sufficient understanding of the content object 34c being summarized.

Figure 10:
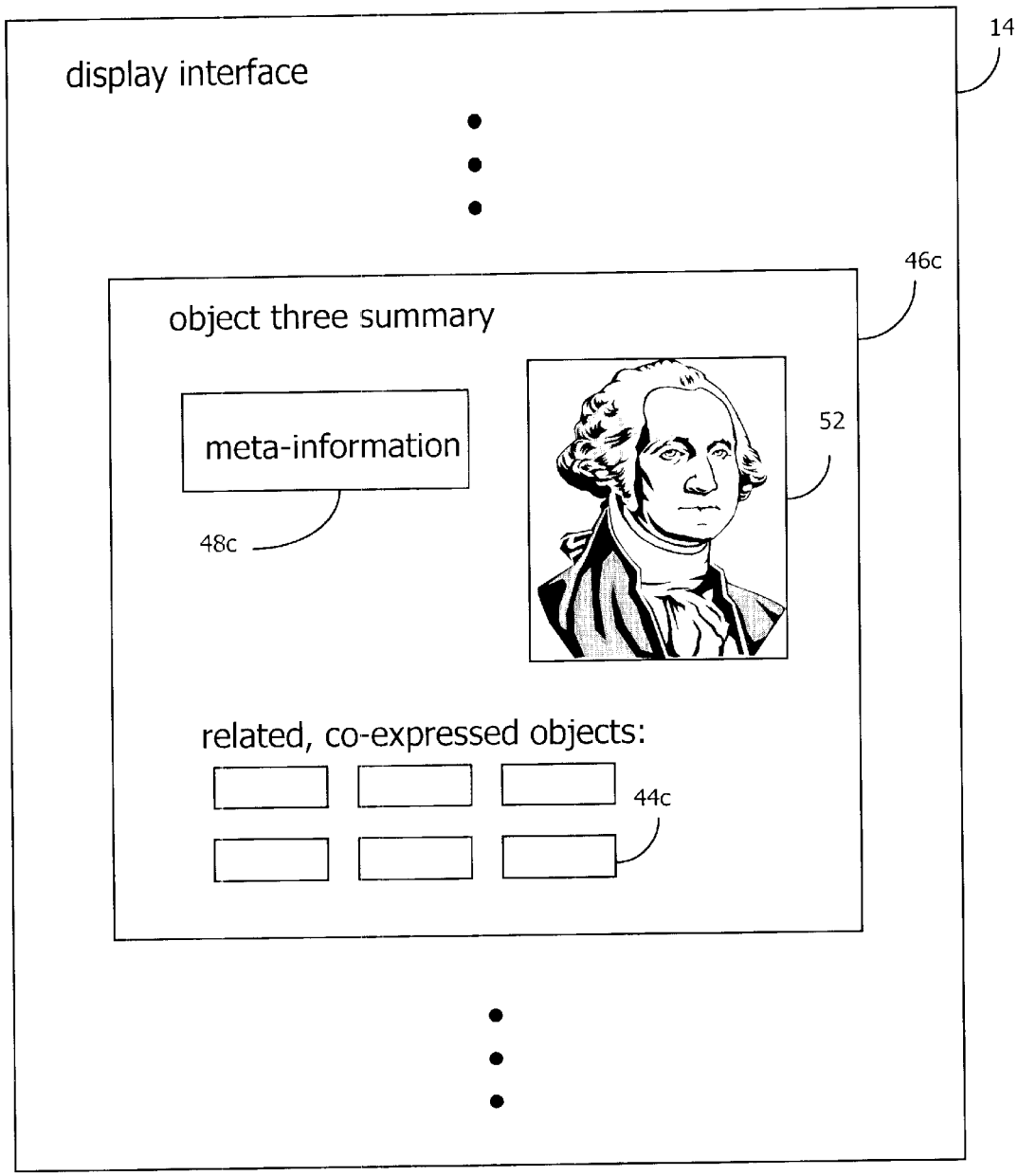
FIG. 10 is a block diagram of the display interface where the information is image data according to one embodiment of the invention.

There are instances, however, where presentation of the information 38 may be desired. Such may be true where the information 38 is an image, for example. In FIG. 10, according to one embodiment, the display interface 14 includes an object three summary 46c. The object three summary 46c represents a content object 34c. The object three summary 46c further includes related, co-expressed objects 44c.

One or more of these objects 44c may include image information. For example, where the object 34 being summarized is a book, related, co-expressed objects 44 may include one or more images, such as the book's cover or title page. Accordingly, in one embodiment, an image 52 is displayed in the object three summary 46c. The image 52 thus provides a visual association to the content object 34c represented. Such an implementation may greatly facilitate image retrieval, in some environments.

Navigation Tools

Figure 11:
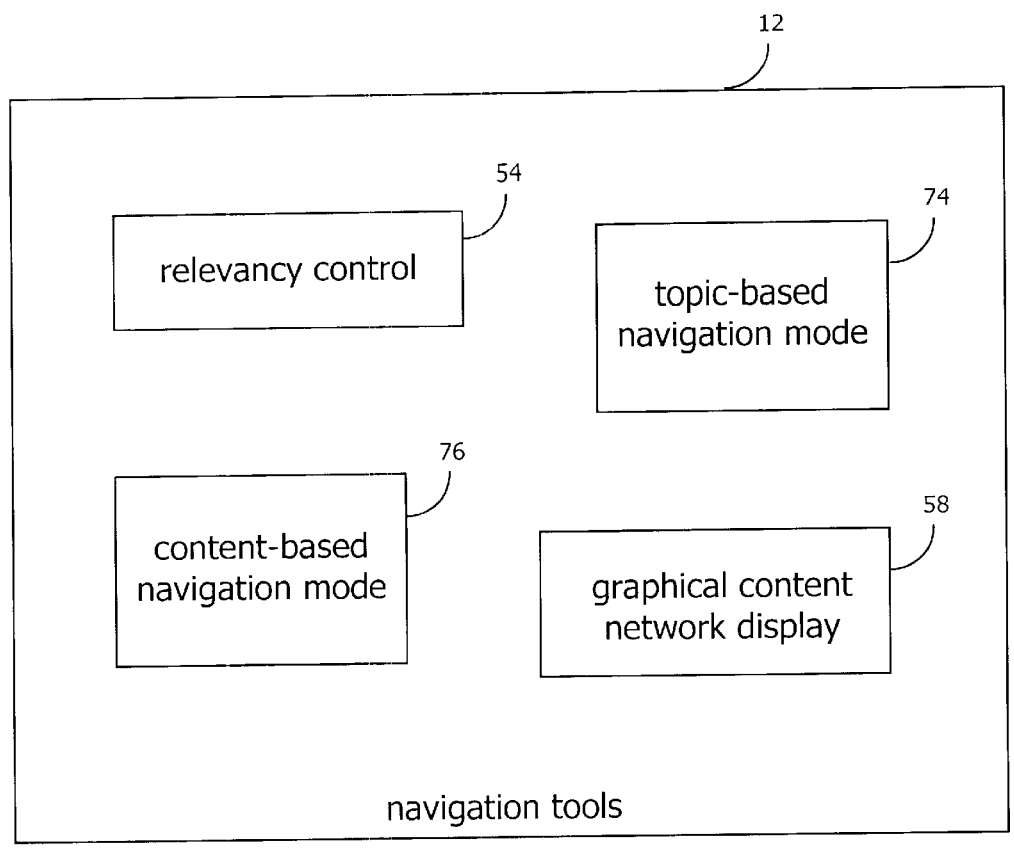
FIG. 11 is a block diagram of the navigation tools according to one embodiment of the invention.

Referring back to FIG. 4, the user layer 10 further includes navigational tools 12, according to one embodiment. The navigational tools 12 enable a user to choose the portions of the content network 40 to be displayed. In one embodiment, the navigational tools 12 include relevancy control 54, topic-based navigation mode 74, content-based navigation mode 76, and graphical content network display 58, as illustrated in FIG. 11. Other navigational tools 12 may be used by the system 100, such as natural language interfaces and interactive methods, to facilitate access to the content network 40, such as during a search of the content network 40.

Relevancy Controls

Figure 12:
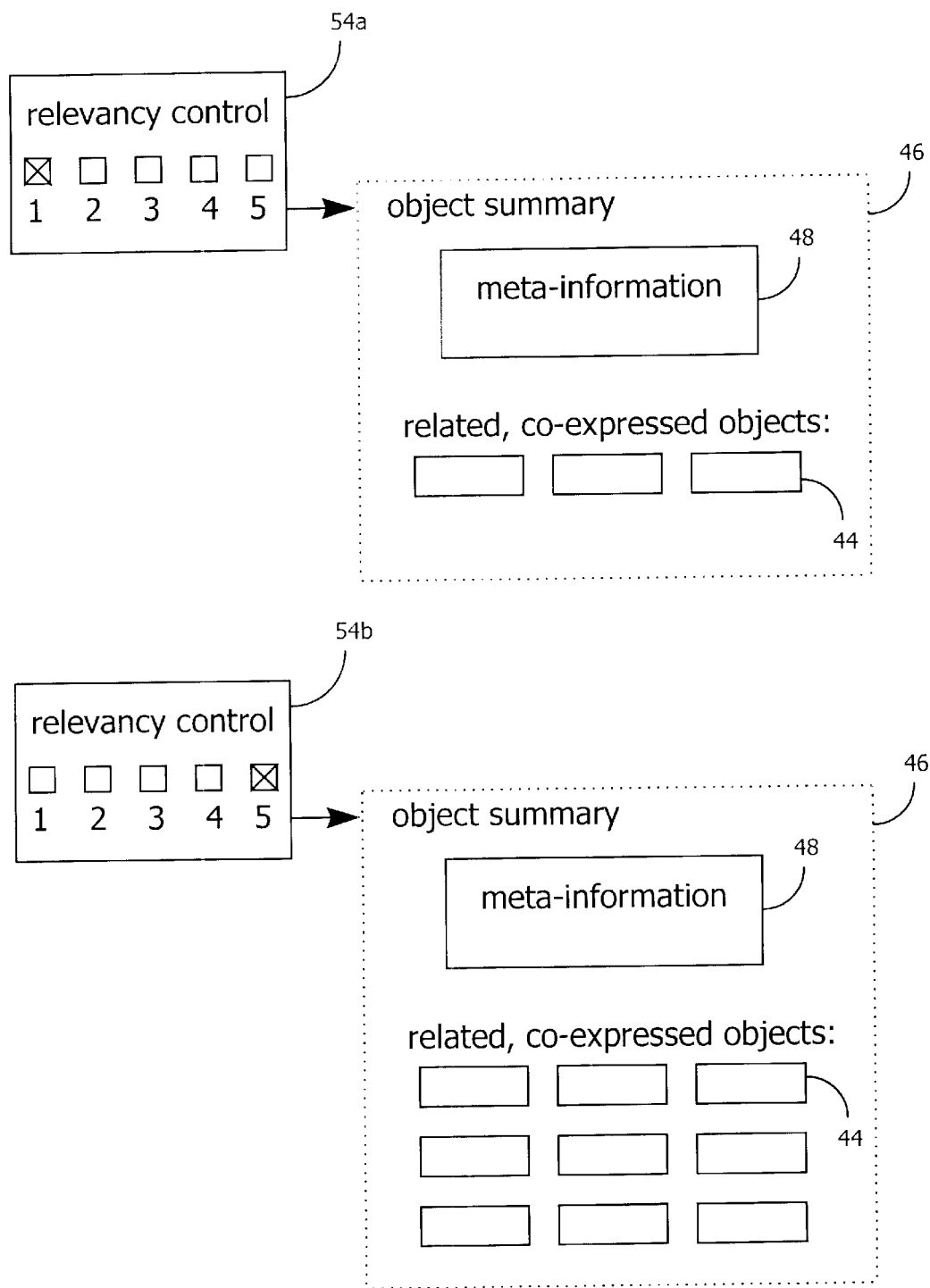
FIG. 12 is a block diagram illustrating relevancy control according to one embodiment of the invention.

Relevancy control 54 enables a user to control the degree to which related objects 44 are co-expressed in the object summary 48 of the display interface 14. In one embodiment, the relevancy control 54 is a GUI window, such as depicted in FIG. 12.

For example, in one embodiment, the user may select relevancy control based on a set of either discrete or continuous numeric values, for example, between 1 and 5. A "1," for example may indicate that only the most highly related objects 34 are co-expressed. Accordingly, in FIG. 12, where a "1" is selected in the relevancy control 54a, only three objects 44 are co-expressed. Likewise, a "5" may indicate that all objects 34 that are related, even if only distantly, may be co-expressed. Thus, in FIG. 12, where a "5" is selected in the relevancy control 54b, nine objects 44 are co-expressed.

In another embodiment, the relevancy controls 54 use subjective, rather than numeric, descriptors, as with the relationship indicators 42, described above. These subjective descriptors may be words that depict the "quality" of the relationship, for example. For example, subjective descriptors "high," "medium," and "low" may indicate a desired relevancy selection.

The relevancy control 54 may be available to administrators or to end users, as desired. The dominion of the relevancy control 54 may also be adjustable. For example, the relevancy control 54 may have a global effect (e.g., impact all object summaries 56) or may be intended only for a single object 34 (and, thus, its associated object summary 56). Thus, the relevancy control 54 dynamically adjusts the granularity of query operations performed on the content network 40.

Topic-based Navigation

Figure 13:
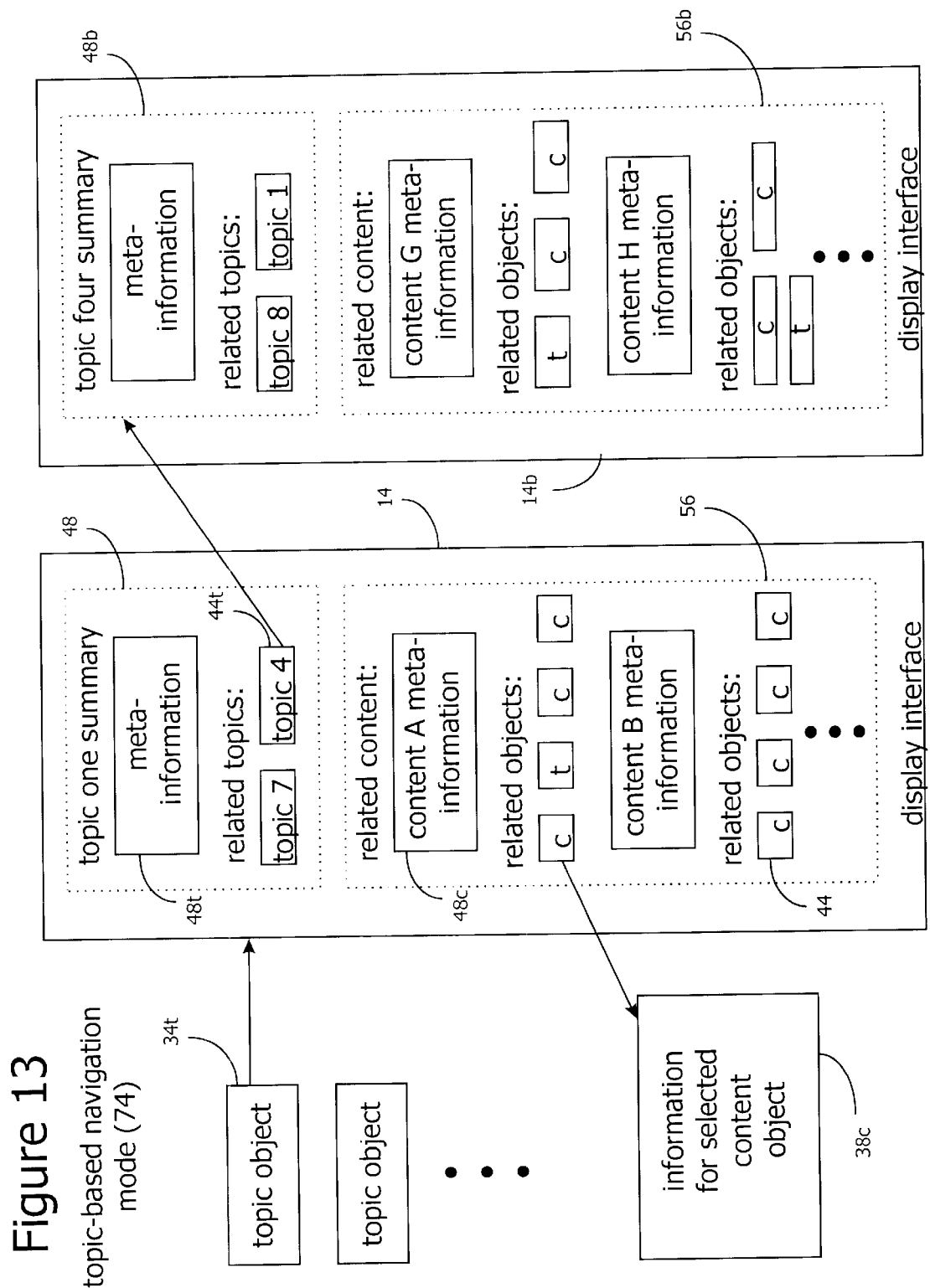
FIG. 13 is a block diagram of recursive navigation of the content network according to one embodiment of the invention.

Also part of the navigation tools 12, the system 100 may employ a topic-based navigation mode 74, according to one embodiment, as depicted in FIG. 13. The topic-based navigation mode 74 enables users to view and select topic objects 34t in the content network 40. When a topic object 34*t* is selected, the display interface 14 is reorganized to allow the direct viewing of the meta-information 48*t* associated with the topic object 34*t*, as well as related topic objects 44*t*.

Further, during the topic-based navigation mode 74, the display interface 14 includes a related content window 56, which presents a summary of content objects 34*c* that are pertinent to the selected topic 34*t*. Accordingly, meta-information 48*c* for the related content object 34*c* is displayed, as well as related objects 34. The related objects 34 in the related content window 56 may be content objects 34*c* (denoted "c") or topic objects 34*t* (denoted "t").

According to one embodiment, when a user selects a content object 34*c*, a window appears with the actual information 38*c* displayed, as illustrated in FIG. 13. However, if a topic object 34*t* from the topic summary 48 is selected, a different display interface 14*b* appears. In the new display interface 14*b*, the selected topic object 34*t* is described in a fashion similar to that of the original topic object 34*t*, this time with its own topic summary 48*b* and related content window 56*b*. The topic-based navigation mode thus enables recursive navigation through any and all of the topic objects 34*t* of the content network 40.

Content-based Navigation

Likewise, a content-based navigation mode 76 is available on the system 100, according to one embodiment. Users may view and select objects 34 in the content network 40 independently of the overall topic-based structure, or may view content within a selected topic.

For example, suppose the system 100 includes a class of content objects 34*c* designated "people." A user may display any or all of the individual "people" content objects 34*c* in the content network 40. Alternatively, the user may display the "people" content objects 34*c* for a selected topic object 34*t*.

In one embodiment, during the content-based navigation mode 76, the display interface 14 is organized such that the meta-information 48 for each content object 34*c* selected is directly viewable, along with related objects 44. When a user selects a particular content object 34*c*, a window appears with the information 38*c* (see FIG. 3B). A full range of selection and display options may be provided, including the ability to select and/or sort by dates, by title, by author, by quality, etc.

Graphical Content Network Display

Figure 14:
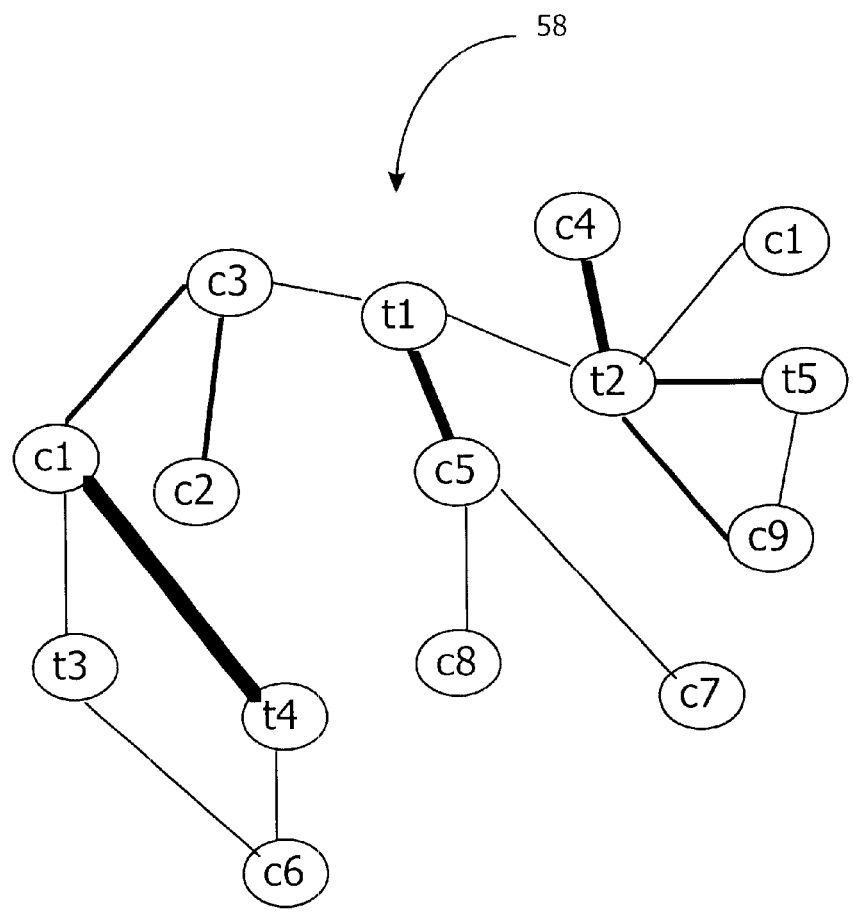
FIG. 14 is a block diagram of the graphical content network display according to one embodiment of the invention.

In another embodiment, the navigation tools 12 provide a graphical content network display 58, as depicted in FIG. 14. A portion of the content network 40 is represented in the graphical content network display 58. The topic objects 34*c* and topic objects 34*t* are represented with distinct textual labels, as shown. A line connecting between two objects 34 graphically denotes a relationship between them.

Upon request, the graphical content network display 58 is presented to a user via the display interface 14. In addition to the connecting line, in one embodiment, the relatedness between the objects 34 is depicted by lines of varying thickness. For example, a "thick" line may indicate a closer relationship between objects 34 than a "thin" line. In another embodiment, the relatedness between objects 34 is depicted by lines of varying color. A variety of graphical representations may illustrate the relatedness of two objects 34.

The relevancy control 54, described above in conjunction with FIG. 12, may be used to control the granularity of the graphical content network display 58, in one embodiment. This enables a user to select a topic object 34*t* and a desired relevancy control 54, upon which a customized graphical content network display 58 may be presented.

In one embodiment, the new display 58 is centered around the selected topic object 34*t*, e.g., is in the "neighborhood" of the topic object 34*t* in the content network 40. The graphical content network display 58 may thus facilitate recursive navigation through any and all topic objects 34*t* in the content network 40, using a graphical display.

When a user selects a content object 34*c* from the graphical content network display 58, the actual information 38 may be displayed. Where the selected content object 34*c* encapsulates a pointer to information instead of information, the information may be first retrieved and then displayed to the user.

Content Affinity Matrix

In one embodiment, the system 100 provides yet another representation of the content network 40, known as a content affinity matrix. Depicted in FIG. 15, content affinity matrix 60 includes relationship indicators 42 between content objects 34*c* (denoted "cx") and topic objects 34*t* (denoted "tx"). Along the horizontal axis of the content affinity matrix 60 is a list of all topic and content objects 34 in the content network 40. Likewise, the same list is arranged in the same order along the vertical axis of the matrix 60.

Each cell in the matrix 60 is a relationship indicator 42, representing the degree of relatedness (or "relevance") between the corresponding row and column objects 34. Since the relationship indicator 42 is normalized, each cell will accordingly include an entry between 0 and 1.

The cells on the diagonal all contain a "1," as this denotes that each object 34 is bi-directionally related to itself fully. The matrix 60 need not be symmetric around the diagonal, however, as the bi-directional relationships between any two objects 34 may not be equivalent. Where a "0" entry is found, no relationship between the objects 34 is established.

In one embodiment, the content affinity matrix 60 is presented to the user, upon request, in the display interface 14. The matrix 60 depicts every possible relationship among all objects 34 in the content network 40. As with the graphical content network display 58, a color-coding scheme may be used to show the degree of relatedness among the objects 34. Selection controls, too, may be provided to enable the display of selected portions of the content network 40 in this display mode.

In one embodiment, the system 100 establishes different relationship indicators 42, depending on a user selection. For example, relationship indicators 42 may be established by the publisher or administrator of the content network 40, such as when first establishing content and topic objects 34. The publisher or administrator may further edit the relationship indicators 42, say, as a "second pass" operation in maintaining the content network 40.

Additionally, the system 100 enables the relationship indicators 42 to be generated automatically, based upon usage patterns of the content network 40. Further, the relationship indicators 42 may be established using pattern-matching techniques, such as where two objects 34 have similar information 38, yet the administrator failed to identify this. The relationship indicators 42 may thus be established by human effort, through a trusted administrator, automatically, using software, or through a combination of these methods.

The content affinity matrix 60 may thus reflect any or all of these methods. Further, the system 100 may maintain distinct content affinity matrices 60, one for each relevance gathering mechanism, for example. The availability of one or more of the content affinity matrices 60 may be restricted to a particular group of users. In some embodiments, one or more of the content affinity matrices 60 may be modified by a user.

Customized Portals

Figure 16:
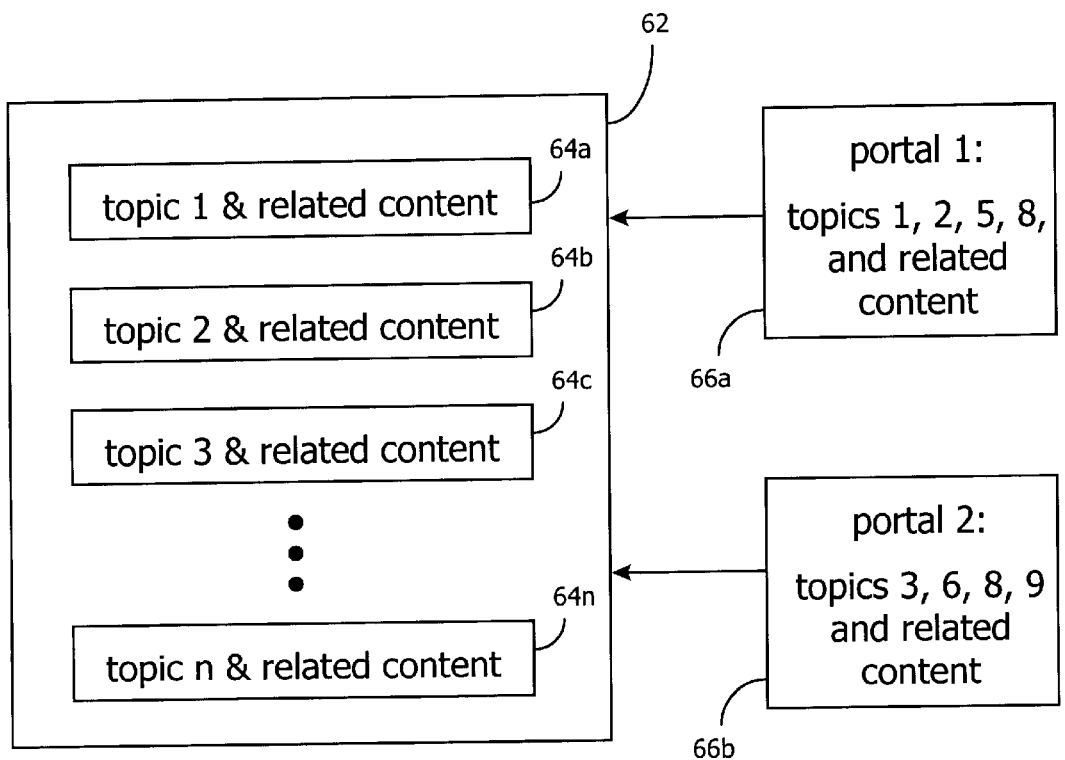
FIG. 16 is a block diagram illustrating portal management according to one embodiment of the invention.

The system 100 further provides the capability to limit access to the content network 40. In FIG. 16, for example, the content network 40 is represented as a list 62 of topics and their related content 64. In one embodiment, selected subsets of the content network 40 may be made available to different user communities. These subsets of the content network 40 are known as portals 66.

The system 100 allows an unlimited number of portals 66 to be developed, each with its own security. Users may have full navigation and publishing capabilities for the portals 66 defined for their community, but are unable to navigate or publish to other parts of the content network 40.

In FIG. 16, for example, a user community that has access to portal 66a may access topic objects 1, 2, 5, and 8, as well as objects 34 related to each topic object 34t. Users or administrators of the system 100 may thus dynamically select topic objects 34t in the content network 40 to be allocated to particular portals 66. The associated portal 66 then has access to the topic object 34t itself, as well as all associated content objects 34c that are related to the topic object 34t.

In one embodiment, the display interface 14 facilitates the creation of portals 66. A list of all portals 66 is displayed, along with all topic objects 34t associated with each portal 66. From a master list of topic objects 34t, the user may then selectively assign topic objects 34t to a particular portal 66. Likewise, the administrator or user may remove topic objects 34t from the portal 66.

In one embodiment, once a user has access to a particular portal 66, the user may add a new topic object 34t to the portal 66, as well as to the content network 40 generally. The user may additionally grant access to the newly created topic object 34t to other portals 66. Further, a user of a portal 66 may grant access to the portal 66 itself by other portals 66. The portal user may likewise delete a topic object 34t from the portal 66 and cascade the deletion throughout the content network 40 and associated portals 66.

Establishing the relationships between objects 34 may be performed as the content network 40 is being created, or as new objects 34 are added to the content network 40, such as by an administrator. In one embodiment, the administrator is familiar with the objects 34 and their relationships. The display interface 14 facilitates entry of relationship information by supplying a list of the current objects 34 in the content network 40 during entry or update of an object 34. As the content network 40 evolves, the relationships between objects 34 may be adjusted.

In some instances, automatic entry of relationships between objects 34 may be preferred. In one embodiment, for example, the system 100 may automatically establish relationships between objects 34 of the content network 40. For example, relationship indicators 42 between objects 34 may automatically be adjusted using statistical pattern matching, neural network technology, or other techniques. The information 38 contained either directly (e.g., content objects 34c) or indirectly (e.g., topic objects 34t that are related to content objects 34c) in the objects 34 may be used to automatically identify relationships. Following this automatic update of relationship information, the administrator or other user may fine-tune the relationships established by such automatic mechanisms.

The usage patterns of users of the content network 40 may be identified and stored in some embodiments. Statistical relationships associated with the usage patterns may be used to establish the degree of relatedness among the objects 34. The usage patterns may thus produce "automatic relationship adjustment" between some objects 34 of the content network 40.

For example, if users typically always move from object A to object B, then the relationship between A and B would be high (e.g., 0.8). If, instead, it was rare that users move from object A to object B, then the relationship between A and B would be low (e.g., 0.1). Where the relationship indicator 42 is somewhere between 0.1 and 0.8, the identified usage patterns between objects A and B may result in an adjustment of the relationship indicator 42.

The usage statistics that result in "automatic relationship adjustment" may be based on individual usage, overall community usage, or combinations thereof. The system 100 thus provides a variety of automatic and human-based mechanisms for establishing and maintaining relationships between objects 34 of the content network 40. In some embodiments, users of the content network 40 alternate between the different approaches in managing the relationships between objects 40.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating a content object in a network of objects, the content object comprising:
      information or a pointer to the information; and
      meta-information about the information;
   wherein the meta-information and the information or the pointer to the information are encapsulated in the content object;
   generating a topic object in the network of objects, the topic object comprising meta-information, wherein the meta-information is encapsulated in the topic object;
   identifying a sub-network, the sub-network comprising a plurality of objects and associated relationships;
   wherein one or more types of bi-directional relationships are established between a first content object, a first topic object, or a first sub-network, and a second content object, a second topic object, or a second sub-network;
   establishing a plurality of directionally distinct relationship indicators between the first content object, the first topic object, or the first sub-network, and the second content object, the second topic object, or the second sub-network for each relationship type, wherein each relationship indicator specifies a degree of relatedness or range, from not related at all to wholly related, of relatedness between the first content object, the first topic object, or the first sub-network, and the second content object, the second topic object, or the second sub-network, wherein the degree of relationship of the directionally distinct relationship indicators for a specific bi-directional relationship may be asymmetrical; and
   accessing any object in the network.

2. The method of claim 1, establishing a plurality of directionally distinct relationship indicators further comprising:
   establishing a bi-directional relationship and an associated first directionally distinct relationship indicator between the first content object, the first topic object, or the first sub-network, and the second content object, the second topic object, or the second sub-network to indicate a directionally distinct degree of relationship between the first content object, the first topic object, or the first sub-network and the second content object, the second topic object, or the second sub-network; and establishing a second directionally distinct relationship indicator between the second content object, the second topic object, or the second sub-network, and the first content object, the first topic object, or the first sub-network to indicate a degree of relationship between the second content object, the second topic object, or the second sub-network and the first content object, the first topic object, or the first sub-network, wherein the second directionally distinct relationship indicator is associated with the bi-directional relationship.

3. The method of claim 2, establishing a plurality of directionally distinct relationship indicators further comprising:

establishing multiple types of relationships and associated relationship indicators between the first content object, the first topic object, or the first sub-network and the second content object, the second topic object, or the second sub-network in the network.

4. The method of claim 1, establishing a plurality of directionally distinct relationship indicators further comprising:

generating a set of relationships and associated relationship indicators based upon human judgment.

5. The method of claim 1, establishing a plurality of directionally distinct relationship indicators further comprising:

generating a set of relationships and associated relationship indicators based upon a pattern matching algorithm.

6. The method of claim 1, establishing a plurality of directionally distinct relationship indicators further comprising:

generating a set of relationships and associated relationship indicators based upon network usage.

7. The method of claim 1, accessing any object in the network further comprising accessing the object and other objects to which a degree of relationship to the object have been established in the network.

8. The method of claim 7, accessing the object and other objects to which a degree of relationship to the object have been established in the network further comprising:

receiving an access request;

navigating the network using information, meta-information, relationships and the associated directional degrees of relatedness based upon the access request; and retrieving the object.

9. The method of claim 8, retrieving the object further comprising:

retrieving an object summary, the object summary including an object encapsulation and a list of related objects.

10. The method of claim 9, further comprising:

presenting the information to a display interface, wherein the information is from the list of related objects.

11. The method of claim 8, further comprising:

receiving a relevancy control for the access request; and retrieving the network of related objects according to the relevancy control.

12. The method of claim 8, further comprising:

presenting a graphical content network display comprising a graphical representation of the objects of the network and their associated relationship indicators.

13. The method of claim 8, further comprising:

presenting a content affinity matrix comprising a matrix of the objects of the network and their associated relationship indicators.

14. The method of claim 13, further comprising:

presenting a plurality of content affinity matrices, wherein each of the plurality of content affinity matrices represents a distinct set of relationship indicators.

15. The method of claim 8, further comprising:

accessing the network through a portal by a predetermined group of users, wherein the portal restricts the predetermined group of users from accessing a portion of the network.

16. The method of claim 15, further comprising:

allocating portions of the network to portals through selection of topic objects and related content objects.

17. The method of claim 1, further comprising:

accessing the network of objects;

tracking the accesses using a transaction log; and matching the accesses to the objects.

18. The method of claim 1, further comprising:

identifying a plurality of subsets of the network; and applying logical set operators on the subsets.

19. The method of claim 18, applying logical set operators further comprising:

performing a union among two or more of the plurality of subsets; and generating a new subset based upon the union.

20. The method of claim 18, applying logical set operators further comprising:

performing an intersection among two or more of the plurality of subsets; and generating a new subset based upon the intersection.

21. The method of claim 18, applying logical set operators further comprising:

performing a difference among two or more of the plurality of subsets; and generating a new subset based upon the difference.

22. A system comprising:

a network of objects generated from a plurality of data sources;

a content object in the network of objects, the content object comprising:
information or a pointer to the information; and
meta-information about the information; wherein the meta-information and the information or the pointer to the information are encapsulated in the content object;

a topic object in the network of objects, the topic object comprising meta information, wherein the meta-information is encapsulated in the topic object;

a sub-network, the sub-network comprising a plurality of objects and associated relationships; wherein one or more types of bi-directional relationships are established between a first content object, a first topic object, or a first sub-network, and a second content object, a second topic object, or a second sub-network; and a plurality of directionally distinct relationship indicators between the first content object, the first topic object, or the first sub-network, and the second content object, the second topic object, or the second sub-network for each relationship type, wherein each relationship indicator specifies a degree of relatedness or range, from not related at all to wholly related, of relatedness between the first content object, the first topic object, or the first sub-network, and the second content object, the second topic object, or the second sub-network, wherein the degree of relationship of the directionally distinct: relationship indicators for a specific bi-directional relationship may be asymmetrical.

23. The system of claim 22, further comprising a display interface, wherein the display interface interrelates the objects and their relationships and associated relationship indicators.

24. The system of claim 23, wherein the display interface presents one or more content affinity matrices of the objects and the relationship indicators.

25. The system of claim 22, wherein a set of relationships and associated relationship indicators are generated by a user of the system.

26. The system of claim 22, wherein a set of relationships and associated relationship indicators are generated based on access patterns to the objects by one or more users.

27. The system of claim 22, wherein a set of relationships and associated relationship indicators are generated automatically by a software program.

28. The system of claim 22, wherein the objects are distributed over multiple computers on a computer network.

29. An article comprising a medium storing instructions for enabling a processor-based system to:
   generate a content object in a network of objects, the content object comprising:
      information or a pointer to the information; and
      meta-information about the information;
   wherein the meta-information and the information or the pointer to the information are encapsulated in the content object;
   generate a topic object in the network of objects, the topic object comprising meta-information, wherein the meta-information is encapsulated in the topic object;
   identify a sub-network, the sub-network comprising a plurality of objects and associated relationships, wherein one or more types of bi-directional relationships are established between a first content object, a first topic object, or a first sub-network, and a second content object, a second topic object, or a second sub-network; and
   establish a plurality of directionally distinct relationship indicators between the first content object, the first topic object, or the first sub-network, and the second content object, the second topic object, or the second sub-network for each relationship type, wherein each relationship indicator specifies a degree of relatedness or range, from not related at all to wholly related, of relatedness between the first content object, the first topic object, or the first sub-network, and the second content object, the second topic object, or the second sub-network, wherein the degree of relationship of the directionally distinct relationship indicators for a specific bi-directional relationship may be asymmetrical.

30. The article of claim 29, further storing instructions for enabling a processor-based system to:
   establish a bi-directional relationship and an associated first directionally distinct relationship indicator between the first content object, the first topic object, or the first sub-network, and the second content object, the second topic object, or the second sub-network to indicate a directionally distinct degree of relationship between the first content object, the first topic object, or the first sub-network and the second content object, the second topic object, or the second sub-network; and
   establish a second directionally distinct relationship indicator between the second content object, the second topic object, or the second sub-network, and the first content object, the first topic object, or the first sub-network to indicate a degree of relationship between the second content object, the second topic object, or the second sub-network and the first content object, the first topic object, or the first sub-network, wherein the second directionally distinct relationship indicator is associated with the bi-directional relationship.

31. The article of claim 30, further storing instructions for enabling a processor-based system to:
   establish multiple types of relationships and associated relationship indicators between the first content object, the first topic object, or the first sub-network and the second content object, the second topic object, or the second sub-network in the network.

32. The article of claim 31, further storing instructions for enabling a processor-based system to:
   receive a relevancy control for an access request; and
   retrieve the network of related objects according to the relevancy control.

33. The article of claim 32, further storing instructions for enabling a processor-based system to:
   provide a display interface, wherein the display interface interrelates the objects and the relationship indicators.

* * * * *